United States Patent Office 3,416,904
Patented Dec. 17, 1968

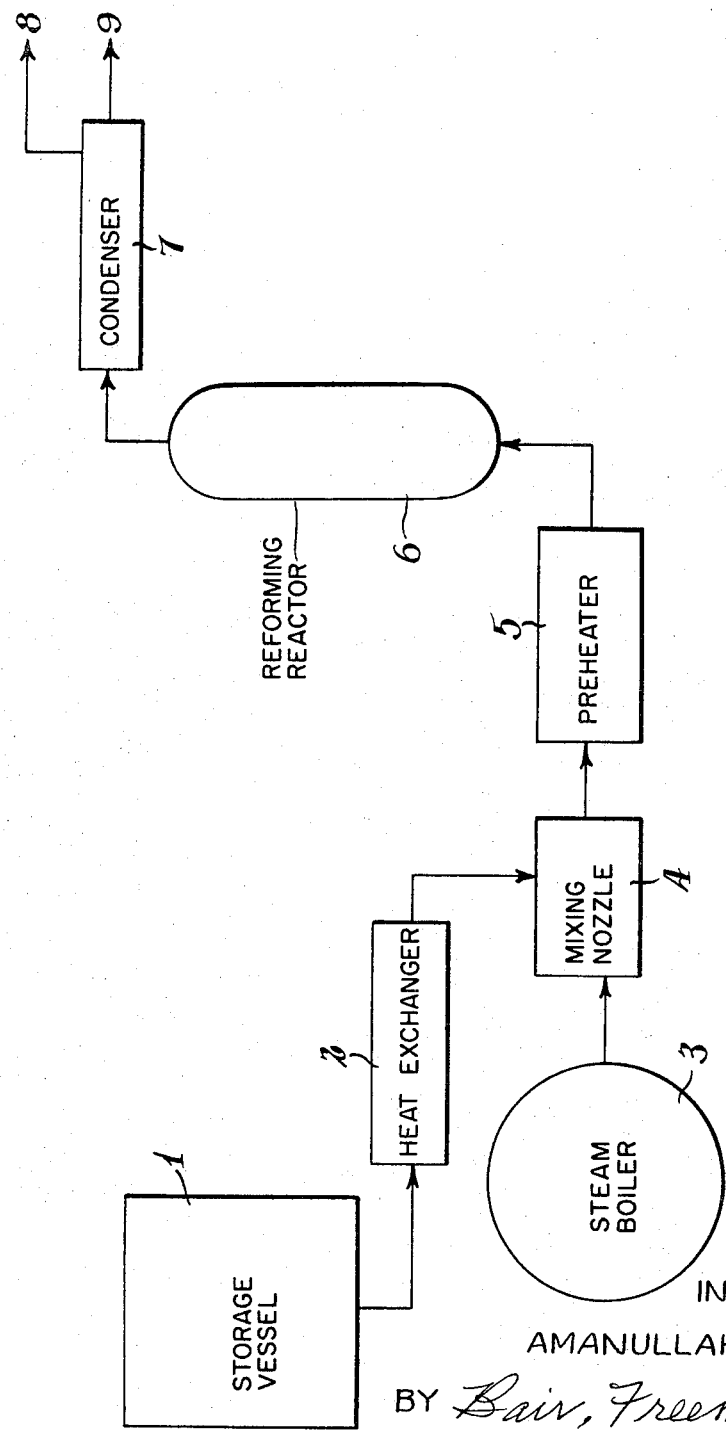

3,416,904
PROCESS FOR GENERATION OF HYDROGEN FROM LIQUID HYDROCARBONS
Amanullah R. Kahn, Chicago, Ill., assignor to Institute of Gas Technology, Chicago, Ill.
Filed Nov. 22, 1965, Ser. No. 509,096
7 Claims. (Cl. 48—214)

ABSTRACT OF THE DISCLOSURE

A one-stage process wherein hydrocarbons having an end boiling point up to 500° F. are converted by steam reforming to hydrogen-rich gas which may be used inter alia for any applicable chemical processes, or can be selectively methanated for use in an acid fuel cell. The hydrocarbon feedstocks may contain a relatively high proportion of normal olefins and cycloolefins and aromatics such as benzene. The vaporized hydrocarbons are steam reformed in a reactor in the presence of a nickel-alumina-aluminum catalyst at pressures preferably from 1–5 atmospheres, and at temperatures ranging from about 700° F. to 1100° F. The typical catalyst contains 44–56 weight percent nickel, 22–38 weight percent alumina and the remainder aluminum.

SPECIFICATIONS

This invention relates to an improved process for the conversion of hydrocarbons into hydrogen-rich gases. In particular, the invention relates to a novel steam reformation process whereby hydrocarbons have an end boiling point up to 500° F. are converted to hydrogen-rich gas, which gas can be used for any purpose wherein hydrogen is required, e.g., it can be methanated to remove carbon monoxide to be rendered suitable for use as fuel for an acid-type fuel cell, as described in copending application Ser. No. 461,298, filed June 4, 1965.

Sources of hydrogen are in great demand as a fuel and for various chemical processes. For example, considerable interest during the past few years has been focused on the electrochemical conversion of chemical fuel and oxidant in a fuel cell to produce electricity. Because of its noiseless and efficient operation, the fuel cell is a very desirable device for production of electricity. Until the present time, most of the development work which has been accomplished has been with fuel cells using pure hydrogen as fuel and oxygen or air as the oxidant. Hydrogen is a very desirable electrochemical fuel since it is highly reactive. Nevertheless, it has two major drawbacks: high cost and difficulty in storage. This invention is a process by which a hydrogen-rich gas is produced which may find use in fuel cells.

One process for the production of hydrogen-rich gases from hydrocarbons, particularly for use in fuel cells, utilizes catalytic steam reforming and has as its goal the production of pure hydrogen via palladium diffusion. This process is undesirable because it requires expensive high temperature and high pressure equipment and further requires use of expensive diffusion equipment.

Prior art in catalytic steam reforming of hydrocarbon feeds having an end boiling point up to 500° F. has required the use of high temperatures, above 1100° F., and high steam to hydrocarbon ratios, typically more than 4.5 pounds per pound of hydrocarbon. In order to avoid carbon deposition and subsequent plugging of catalyst beds, especially at superatmospheric pressures and in the presence of nonparaffinic hydrocarbons, the steam to hydrocarbon ratios has to be substantially higher. Examples of such minimum steam to hydrocarbon ratio at typical operating temperature of 1100° F. to 1850° F. and pressures up to 350 p.s.i.g. are described in U.S. Patent No. 3,106,457. Where low temperature steam reforming of liquid hydrocarbon has been practiced for the purpose of making methane at temperatures below 1100° F., as described in British Patent No. 820,257, the composition of the gas produced contains a relatively low amount of hydrogen. Also, in such processes the presence of olefins and aromatics in the feed is deleterious and harmful to catalyst activity and, therefore, such processes require a pretreated feed. It is, therefore, desirable to provide a process for the production of hydrogen by the catalytic steam reforming of hydrocarbons free from the above limitations.

It is thus an object of this invention to produce continuously from all types of hydrocarbons having an end boiling point up to 500° F., hydrogen-rich gases.

It is another object of this invention to produce continuously from such hydrocarbons hydrogen-rich gases which may be further treated by methanation to produce a gas suitable for use in low temperature acid fuel cells.

It is a further object of this invention to produce continuously from such hydrocarbons hydrogen-rich gases suitable for use in any chemical processes requiring such gases and which serve as a source of hydrogen for further purification, if desired.

It is another object of the invention to produce continuously from hydrocarbons having an end boiling point up to 500° F., hydrogen-rich gas wherein the hydrocarbons may contain olefins and aromatics.

A further object of this invention is to produce continuously from such hydrocarbons hydrogen-rich gases suitable for processing to make fuel gas for low temperature acid fuel cells wherein the process occurs at temperatures significantly lower than conventional practice so that the gas generator can be brought to operating conditions from ambient temperature more rapidly and less expensive materials of construction may be used.

Another object of this invention is to produce continuously from such hydrocarbons hydrogen-rich gases by a process which can operate at significantly lower pressures than are normally required for hydrogen generation processes. In my process, the lower operating pressure increases the hydrogen yield and reduces the weight of the process equipment.

Another object of this invention is to produce from hydrocarbons a hydrogen-rich gas whereby the gas so produced is at a lower temperature than is conventional for steam reforming processes and where the steam-to-hydrocarbon feed ratio is also lower than in such processes.

Other objects will become apparent as the invention is more fully described hereinafter.

When hydrocarbons such as petroleum distillates are reformed with steam over a highly active catalyst the following reaction occurs:

$$C_nH_{2n+2} + H_2O \rightarrow CH_4 + CO + CO_2 + H_2 \quad (1)$$

The precise composition of the resulting gas is determined by the reaction conditions and by the following reactions both of which tend to approach equilibrium at the preferred reaction conditions:

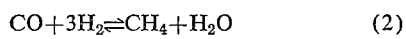
$$CO + 3H_2 \rightleftharpoons CH_4 + H_2O \quad (2)$$
$$CO + H_2O \rightleftharpoons CO_2 + H_2 \quad (3)$$

In order to achieve the maximum hydrogen production in the process of this invention, the following principles apply: high temperatures, low pressures and high steam-to-hydrocarbon feed weight ratios, increase hydrogen yield. As pressure is decreased hydrogen yield is increased and methane yield is decreased. As temperature is increased, hydrogen yield is increased and methane yield decreased. As steam-to-hydrocarbon ratio is increased, the hydrogen yield increases and, at any given temperature and pressure approaches a limiting ratio beyond which further increase in steam results in negligible increases in hydrogen yield and decreases in methane yield. The yield of carbon dioxide increases with an increase in steam-to-hydrocarbon feed weight ratio and increases with a decrease in temperature, but varies only slightly with changes in pressure. In addition, the molecular weight and composition of the feedstock will dictate optimum conditions of temperature and pressure and steam-to-hydrocarbon feed weight ratios.

In selecting steam-to-hydrocarbon feed weight ratios for this process, I have found the following to be true: As the aromatic and olefin contents and the molecular weight of the feed increase, and as the temperature increases, more steam is required. The minimum steam-to-hydrocarbon weight ratio required to prevent carbon deposition will depend upon the molecular weight and composition of the feedstock for any given set of reactor operating conditions.

The objects of this invention are achieved by reacting with steam hydrocarbons having an end boiling point up to 500° F. and are vaporous at the operating conditions of the reactor in the presence of a nickel-alumina-aluminum catalyst at pressures ranging from 1 to 10 atmospheres, preferably 1 to 5 atmospheres, and at temperatures ranging from about 700° F. to 1100° F. Typical hydrocarbon feedstocks useful in this invention are liquified petroleum gases, petroleum naphthas, natural gasoline, kerosene, JP-4 and similar petroleum distillates. The steam-to-hydrocarbon weight ratio of feed material is to be maintained above the minimum required to prevent carbon deposition for the particular feedstock at the desired operating conditions.

To achieve a close approach to equilibrium within the temperature range of 700° F. to 1100° F., a highly active catalyst is required. I have found that it is essential in the practice of this invention to use a novel nickel-alumina-aluminum catalyst containing from 25% to 80% by weight nickel, 19% to 60% by weight alumina and the balance aluminum.

As a typical example, the catalyst used in this invention is prepared as follows: An alloy composed of approximately 42 weight percent nickel and 58 weight percent aluminum is crushed into particles of one-half inch diameter or less, and treated with twice its weight of a 0.5 N sodium hydroxide solution in water. When the nickel-aluminum alloy is treated with sodium hydroxide solution a reaction occurs resulting in evolution of hydrogen and formation of sodium aluminate and alumina. Hydrogen is allowed to evolve until the desired conversion of aluminum is obtained, preferably 30% to 85%. During this reaction, the temperature of the mixture is maintained at its boiling point by external heating. After the desired conversion is obtained, the reaction is quenched with water. The catalyst is then repeatedly washed with tap water equal each time in weight to the weight of the original alloy for a minimum of 15 washings. After this procedure is accomplished, the catalyst is subjected to four equivalent washings with methanol and then stored in methanol for use in the process. Alternatively, the catalyst may be stored in ethanol, dioxane or other suitable media. Typical compositions of the catalyst prepared by the above procedure are as follows:

| Catalyst Batch No. | Composition, weight percent | | |
|---|---|---|---|
| | 1 | 2 | 3 |
| Aluminum | 18.5 | 20.3 | 22.0 |
| Nickel | 44.3 | 42.4 | 55.4 |
| $Al_2O_3 \cdot H_2O$ | 37.2 | 37.3 | 22.6 |
| | 100.0 | 100.0 | 100.0 |

I have discovered that the process of the invention will operate satisfactorily with feedstocks containing a relatively high proportion of normal olefins and cycloolefins and aromatics such as benzene. In prior processes it has always been necessary to maintain the olefin and aromatics in the feedstock as low as possible.

Another novel and unexpected result of the present invention is the high rate at which the feedstock can be converted as it passes through the reactor.

For purposes of illustration, an embodiment of the invention is shown in the accompanying drawing which is a schematic flow diagram of the overall process.

In the drawing illustrating the practice of this invention, numeral 1 represents a storage vessel wherein the hydrocarbon feedstock is stored. Preferably the feedstock is paraffinic hydrocarbons but may contain aromatics and olefins. The hydrocarbon feed is pumped through a heat exchanger 2 wherein it is vaporized and then blended with steam from boiler 3 in a mixing nozzle 4. The mixture is maintained at a pressure between 1 to 5 atmospheres depending on the operating conditions, nature of feed and desired product gas. The stream of intimately mixed hydrocarbon vapors and steam is then passed through a preheater 5 wherein it is preheated to initial reaction temperature ranging from 700° F. to 1100° F., depending on the operating conditions, nature of feed and desired product gas. The mixture of hydrocarbons, vapors and steam then pass into the reactor 6 through a bed of catalyst, as hereinabove described. The gasification reactions occur here and the hydrocarbons are essentially completely gasified. The resulting effluent which is primarily a mixture of hydrogen, methane, carbon monoxide, carbon dioxide and unreacted steam exits from the reforming reactor, is cooled in heat exchanger 7 wherein steam is removed as liquid, as shown diagrammatically at 9, leaving a gas rich in hydrogen exiting the condenser at 8.

The invention will be further described by means of the following examples, it being understood that the examples are given for purposes of illustration only and are not to be construed in any way as restricting the invention beyond the scope of the appended claims.

Example I

An apparatus embodying the system shown in the drawing was employed in the gasification of a natural gasoline for production of hydrogen-rich gas.

The properties of said feedstock were as follows:

| | |
|---|---|
| Specific gravity, ° API | 76.1 |
| ASTM distillation range, ° F. | 88–338 |
| Reid vapor pressure, p.s.i.g. | 13.63 |
| Sulphur, wt. percent | 0.0146 |

Composition:
| | |
|---|---|
| Paraffins, vol. percent | 86.0 |
| Napthenes, vol. percent | 11.3 |
| Aromatics, vol. percent | 2.7 |
| Total | 100.0 |

No carbon deposition on the catalyst or liquid hydrocarbon breakthrough occurred and run conditions were as follows:

| | |
|---|---|
| Catalyst volume, cc. | 25 |
| Reactor pressure, p.s.i.g. | 14.7 |
| Temperature at center of bed, ° F. | 1060 |
| Steam-to-gasoline weight ratio | 2.93 |
| Gasoline space velocity, lb./hr.-cu. ft. catalyst | 297 |

Product gas composition (water-free):
| | |
|---|---|
| $CO_2$, mole percent | 22.0 |
| $H_2$, mole percent | 51.4 |
| $CH_4$, mole percent | 25.1 |
| CO, mole percent | 1.5 |
| Total | 100.0 |

Example II

An apparatus embodying the system shown in the drawing was employed in the gasification of a jet fuel (JP-4) for production of the hydrogen-rich gas.

The properties of said feedstock were as follows:

| | |
|---|---|
| Gravity, °API | 56.5 |
| ASTM distillation range, °F. | 194–478 |
| Sulphur, wt. percent | 0.0042 |

Composition:

| | |
|---|---|
| Saturates, vol. percent | 84.8 |
| Olefins, vol. percent | 4.6 |
| Aromatics, vol. percent | 10.6 |
| Total | 100.0 |

No carbon decomposition on the catalyst or hydrocarbon breakthrough occurred and run conditions were as follows:

| | |
|---|---|
| Catalyst volume, cc. | 25 |
| Reactor pressure, p.s.i.g. | 14.7 |
| Bed temperature, °F. | 968 |
| Steam-to-jet fuel weight ratio | 5.16 |
| Jet fuel space velocity, lb./hr.-cu. ft. catalyst | 183 |

Product gas composition (water-free):

| | |
|---|---|
| $CO_2$, mole percent | 22.7 |
| $H_2$, mole percent | 57.1 |
| $CH_4$, mole percent | 18.9 |
| CO, mole percent | 1.3 |
| Total | 100.0 |

From the above examples, it is apparent that the process produces high hydrogen content gas continuously from hydrocarbons containing olefins and aromatics and with end boiling points as high as 500° F. when reacted with steam in the presence of the novel nickel-alumina-aluminum catalyst. These gases may be successfully treated to selectively methanate carbon monoxide in the presence of a large amount of carbon dioxide and methane and fed directly to an acid fuel cell to generate electricity, as described in copending application Ser. No. 461,298, filed June 4, 1965, noted above, or such gases may be used as a source of hydrogen for any applicable chemical processes.

I claim:
1. Process for making hydrogen-rich gas from liquid hydrocarbon feedstocks having an end boiling point up to 500° F., which process comprises reacting vaporized feedstock with steam in the presence of a catalyst consisting essentially of nickel-alumina-aluminum at a pressure between 1 to 5 atmospheres and at temperature between 700° F. to 1100° F. to produce a gas rich in hydrogen.

2. A process as in claim 1 wherein said feedstock is hydrocarbon selected from the group consisting of natural gasoline, petroleum naphthas, kerosene, liquified petroleum gases and JP-4 jet fuel.

3. A process as in claim 1 wherein said feedstocks include normal olefins, cycloolefins and aromatics.

4. A process as in claim 1 in which said nickel-alumina-aluminum catalyst contains 25 to 80 weight percent nickel, 10 to 60 weight percent alumina and the remainder aluminum.

5. A process as in claim 4 wherein said nickel-alumina-aluminum catalyst contains 44–56 weight percent nickel, 22–38 weight percent alumina and the remainder aluminum.

6. A process as in claim 1 wherein said pressure is maintained at substantially 1 atmosphere.

7. A process as in claim 6 wherein said steam-to-feedstock weight ratio is less than 3.

References Cited

UNITED STATES PATENTS

| | | | |
|---|---|---|---|
| 1,915,473 | 6/1933 | Raney | 252—466 |
| 3,271,325 | 9/1966 | Davies et al. | 48—214 XR |
| 3,278,268 | 10/1966 | Pfefferle | 48—214 XR |

FOREIGN PATENTS

| | | |
|---|---|---|
| 655,007 | 1/1963 | Canada. |

MORRIS O. WOLK, *Primary Examiner.*

R. E. SERWIN, *Assistant Examiner.*

U.S. Cl. X.R.

252—466

UNITED STATES PATENT OFFICE

CERTIFICATE OF CORRECTION

Patent No. 3,416,904            December 17, 1968

Amanullah R. Khan

It is certified that error appears in the above identified patent and that said Letters Patent are hereby corrected as shown below:

In the heading to the printed specification, line 4, "Amanullah R. Kahn" should read -- Amanullah R. Khan --.

Signed and sealed this 24th day of March 1970.

(SEAL)
Attest:

Edward M. Fletcher, Jr.
Attesting Officer

WILLIAM E. SCHUYLER, JR.
Commissioner of Patents